United States Patent
Cargonja et al.

(10) Patent No.: US 7,434,731 B2
(45) Date of Patent: Oct. 14, 2008

(54) METHOD AND APPARATUS FOR EFFICIENT DATA TRANSMISSION FROM A TAG

(75) Inventors: Nikola Cargonja, San Carlos, CA (US); Joseph S. Chan, Los Gatos, CA (US)

(73) Assignee: Savi Technology, Inc., Mountain View, CA (US)

( * ) Notice: Subject to any disclaimer, the term of this patent is extended or adjusted under 35 U.S.C. 154(b) by 55 days.

(21) Appl. No.: 11/432,684

(22) Filed: May 11, 2006

(65) Prior Publication Data

US 2007/0262144 A1     Nov. 15, 2007

(51) Int. Cl.
*G06Q 99/00* (2006.01)

(52) U.S. Cl. ............. 235/380; 340/10.1; 340/10.2; 340/10.3; 340/10.4; 340/10.5; 340/10.6

(58) Field of Classification Search ............. 235/380; 340/100–109, 10–10.6
See application file for complete search history.

(56) References Cited

U.S. PATENT DOCUMENTS

| | | | | | |
|---|---|---|---|---|---|
| 5,594,738 | A | * | 1/1997 | Crisler et al. | 370/347 |
| 6,034,603 | A | * | 3/2000 | Steeves | 340/10.2 |
| 2003/0212827 | A1 | * | 11/2003 | Saha et al. | 709/247 |
| 2003/0220711 | A1 | * | 11/2003 | Allen | 700/215 |
| 2006/0077041 | A1 | * | 4/2006 | Chan et al. | 340/10.4 |

* cited by examiner

*Primary Examiner*—Michael G. Lee
*Assistant Examiner*—Allyson N. Trail
(74) *Attorney, Agent, or Firm*—Haynes and Boone, LLP

(57) ABSTRACT

A tag has circuitry with a communication portion that can transmit and receive wireless signals, including wireless transmission of data blocks that each have a predefined configuration with a plurality of data slots. The circuitry includes a further portion that, in response to receipt through the communication portion of a wireless communication containing a request identifying a set of plural data items, populates respective data slots in one data block with respective data items from the set, and then causes the communication portion to effect wireless transmission of that data block.

30 Claims, 8 Drawing Sheets

| DATA SLOT 1 | | | DATA SLOT 2 | | | ... | DATA SLOT N | | |
|---|---|---|---|---|---|---|---|---|---|
| TYPE | LENGTH | DATA | TYPE | LENGTH | DATA | | TYPE | LENGTH | DATA |

| PREAMBLE | SIGNPOST ID | ... | LF WINDOW SIZE | CRC | PACKET END |
|---|---|---|---|---|---|
| 103 | 104 | 111 | 106 | 107 | 108 |

| PREAMBLE | TAG STATUS | MESSAGE LENGTH | READER ID | TAG ID | DATA | ... | CRC | PACKET END |
|---|---|---|---|---|---|---|---|---|
| 123 | 124 | 126 | 127 | 128 | 129 | 141 | 137 | 138 |

| TAG TYPE | ASSET TYPE | SIGNPOST ID |
|---|---|---|
| 132 | 133 | 134 |

US 7,434,731 B2

METHOD AND APPARATUS FOR EFFICIENT DATA TRANSMISSION FROM A TAG

FIELD OF THE INVENTION

This invention relates in general to tracking techniques and, more particularly, to techniques for tracking items or vehicles using radio frequency identification technology.

BACKGROUND

According to an existing technique for tracking items or vehicles, a device known as a radio frequency identification (RFID) tag is mounted on each item or vehicle that is to be tracked. Signposts that transmit short-range signpost signals are provided near locations where tags are likely pass, for example near a door through which tags routinely travel. The tags can receive the signpost signals from nearby signposts, and can also transmit wireless tag signals that include information from the signpost signals. The tag signals typically have an effective transmission range that is significantly longer than the effective transmission range of the signpost signals. Stationary devices commonly known as readers are provided to receive the tag signals. Existing systems of this type have been generally adequate for their intended purposes, but have not been satisfactory in all respects.

BRIEF DESCRIPTION OF THE DRAWINGS

A better understanding of the present invention will be realized from the detailed description that follows, taken in conjunction with the accompanying drawings, in which:

FIG. 2 is a diagrammatic view showing the generic format of a universal data block used in certain communications within the system of FIG. 1.

FIG. 3 is a diagrammatic view of a digital word that is present in wireless signals transmitted by the signpost of FIG. 1.

FIG. 4 is a diagrammatic view of a digital word that is present in one type of wireless signal transmitted by the tag of FIG. 1.

DETAILED DESCRIPTION

Figure 1:
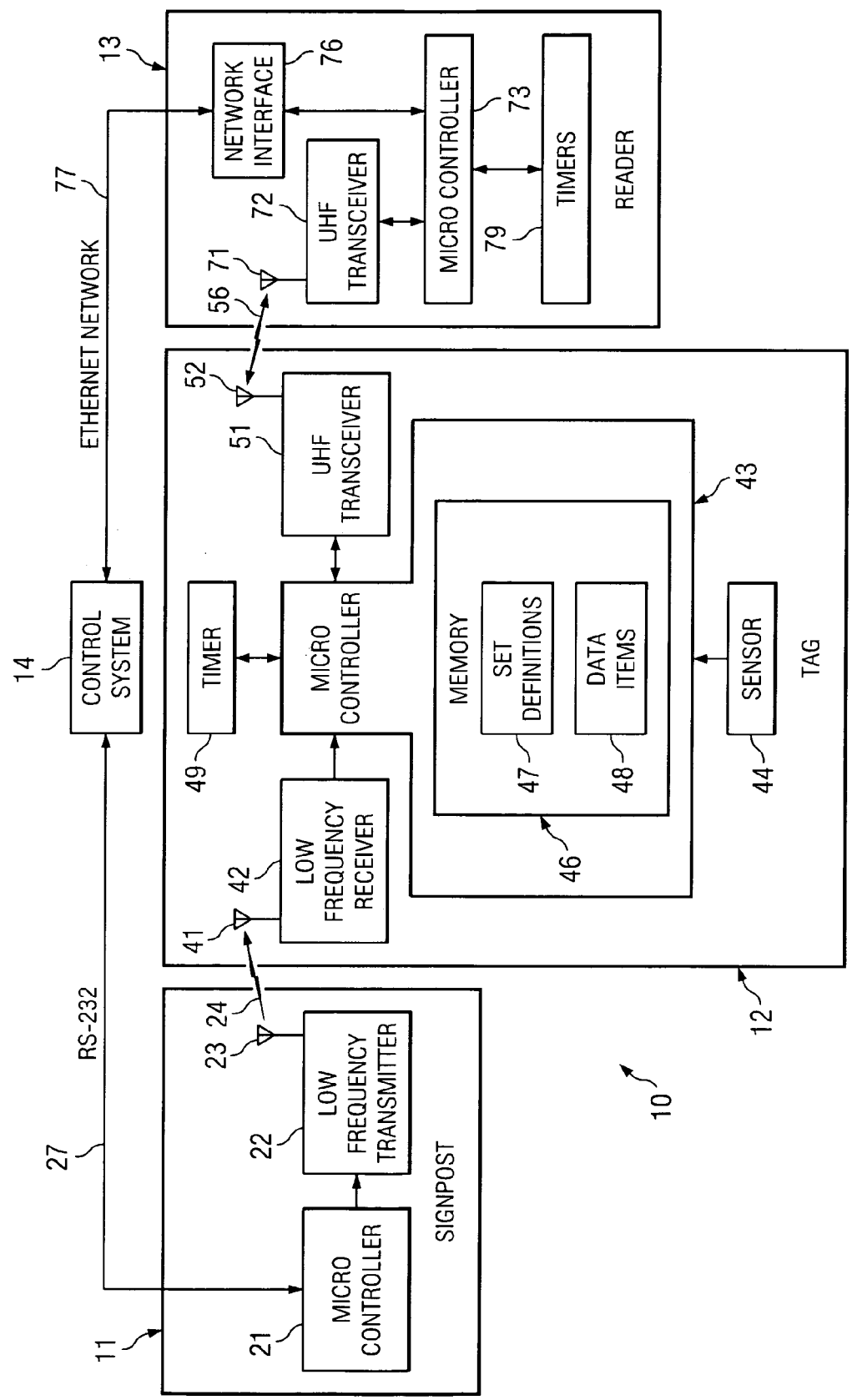
FIG. 1 is a block diagram of an apparatus that embodies aspects of the present invention, and that includes a signpost, a radio frequency identification tag, a reader, and a control system.

FIG. 1 is a block diagram of an apparatus 10 that embodies aspects of the present invention. The apparatus 10 includes a signpost 11, a radio frequency identification (RFID) tag 12, a reader 13, and a control system 14. The apparatus 10 actually includes many signposts of the type shown at 11, many tags of the type shown at 12, and several readers of the type shown at 13. However, for clarity in the discussion that follows, FIG. 1 shows only one signpost 11, one tag 12, and one reader 13. In the disclosed embodiment, the signpost 11 and the reader 13 are stationary, and the tag 12 can move relative to them. For example, the tag 12 may be mounted on a not-illustrated vehicle (such as a truck or forklift), or may be mounted on an item that is being transported (such as a box containing a television set).

The signpost 11 includes a microcontroller 21. Persons skilled in the art are familiar with the fact that a microcontroller is an integrated circuit having a microprocessor, having a read-only memory (ROM) that contains a computer program and static data for the microprocessor, and having a random access memory (RAM) in which the microprocessor can store dynamic data during system operation. The signpost 11 also includes a low frequency transmitter 22 that is controlled by the microcontroller 21, and that is coupled to an antenna 23. The microcontroller 21 can use the transmitter 22 to transmit a low frequency signpost signal 24 through the antenna 23. The transmitter 22 is of a type known to those skilled in the art, and is therefore not illustrated and described here in detail. The antenna 23 can be a ferrite core and/or a planar coil antenna of a known type, or any other suitable form of antenna. The antenna 23 is configured to transmit an omni-directional signal, but the antenna could alternatively be configured to transmit a signal that is to some extent directional.

In the embodiment shown in FIG. 1, the transmitter 22 generates the signpost signal 24 by effecting amplitude modulation of a carrier signal, where the carrier signal can have a frequency within a range of approximately 30 KHz to 30 MHz. Various countries have different governmental regulations regarding electromagnetic emissions. With due regard to these governmental regulations, the carrier frequency in the embodiment of FIG. 1 is selected to the 132 KHz, but could alternatively be some other frequency, such as 125 KHz or 13.56 MHz. A further consideration in the selection of a carrier frequency is that the signpost signals 24 are to exhibit near field characteristics of a primarily magnetic character.

In this regard, electromagnetic signals have both an electric component (the "E" field) and a magnetic component (the "H" field). The magnetic field (H field) has a significantly higher roll-off than the electric field. Consequently, it is possible for the magnetic field to be significant in the near field, but the electric field (E field) will always dominate in the far field, or in other words at locations remote from the transmitter. The low frequency transmitter 22 and the antenna 23 are configured so that the magnetic field (H field) dominates in the near field. Consequently, the transmission and reception of the signpost signals 24 may be viewed as more of a magnetic coupling between two antennas, rather than a radio frequency coupling. As a result, the signpost signals 24 intentionally have a relatively short transmission range. This transmission range is adjustable but, in the disclosed embodiment, is typically about four to twelve feet. The localized nature of the signals 24 helps to facilitate compliance with governmental regulations. It also helps to minimize reception of these signals by tags that are not in the general vicinity of the signpost 11, but are beyond an intended transmission range of the signpost signals 24.

The signpost 11 is operatively coupled to the control system 14 through an interface 27. In the embodiment of FIG. 1, the interface 27 is a standard RS-232 serial interface. However, the interface 27 could alternatively be any other suitable type of interface, including but not limited to an Ethernet interface, an RS-485 interface, or a wireless interface.

The signpost 11 transmits the signpost signal 24 at periodic intervals. The time interval between successive transmissions may be configured to be relatively small, such as 100 msec, or may be configured to be relatively large, such 24 hours, depending on the particular circumstances. The signpost signals 24 contain information that is discussed in more detail later.

The signpost signal 24 is often transmitted in a relatively noisy environment. In order to ensure reliable signal reception, known techniques may be used to improve the signal-to-noise ratio (SNR). In the embodiment of FIG. 1, the amplitude modulation of the 132 KHz carrier is effected using the well-known technique of amplitude shift keying (ASK), in order to improve the SNR. Alternatively, it would be possible to use frequency shift keying (FSK) or phase shift keying (PSK) to achieve an even higher SNR. However, FSK and PSK would typically require additional front-end analog circuitry in each of the tags 12. Therefore, and since it is desirable to be able to implement both the signpost 11 and the tag 12 at a relatively low cost, the embodiment of FIG. 1 uses ASK to achieve a reduced SNR.

Turning to the tag 12, the tag 12 includes an antenna 41 that receives the signpost signals 24 transmitted by the signpost 11. The antenna 41 is coupled to a low frequency receiver 42 of a known type. The receiver 42 is coupled to a microcontroller 43. The receiver 42 receives the signpost signals 24, extracts information from them, and then supplies this information to the microcontroller 43. The tag 12 includes a sensor 44 that is coupled to an input of the microcontroller 43. The sensor 44 may, for example, measure an environmental condition such as an ambient temperature or humidity.

The microcontroller includes a memory that is shown diagrammatically at 46. Among other things, the memory 46 stores set definitions 47 and data items 48. The data items 48 might include the information currently being detected by the sensor 44 (such as a current temperature or humidity), an indication of the current state of a battery that powers the tag 12, a routing code that represents a destination to which the control system 14 is to send information obtained from the tag, or any of a variety of other types of information. The set definitions 47 are discussed in more detail later. The tag 12 also includes a timer 49 that can be used by the microcontroller 43 to measure some time intervals. The time intervals are explained in more detail later.

In FIG. 1, the circuitry within the tag 12 is powered by a not-illustrated battery. The tag 12 has at least two different modes of operation, including a normal operational mode, and a sleep mode. In the sleep mode, some or all of the circuitry within the tag 12 is powered down, in order to conserve battery power.

The microcontroller 43 controls an ultra high frequency (UHF) transceiver 51 of a known type. The transceiver 51 is coupled to a known type of antenna 52. In the disclosed embodiment, the antenna 52 is omni-directional, but the antenna 52 could be alternatively configured to be directional. Using the transceiver 51 and the antenna 52, the microcontroller 43 of the tag 12 can transmit signals 56 to the reader 13, and receive signal 56 transmitted by the reader 13. In the embodiment of FIG. 1, the signals 56 are generated by FSK modulation of certain information onto a radio frequency (RF) carrier signal. This carrier signal has a frequency of 433.92 MHz, but it could alternatively have any other suitable frequency. One possible alternative frequency is 915 MHz. However, the embodiment of FIG. 1 uses the frequency of 433.92 MHz because it is available for use in a larger number of countries under prevailing governmental regulations regarding the transmission of electromagnetic signals.

The transmission range for the signals 56 is substantially longer than that for the signpost signals 24. In the disclosed embodiment, the transmission range for the signals 56 can be up to about 300 feet. The signals 56 contain information that is explained in more detail later.

In FIG. 1, the reader 13 includes an antenna 71 that is coupled to a UHF transceiver 72. As is known in the art, it would be possible for the reader 13 to have two antennas at 71 that are perpendicular to each other, in order to facilitate more reliable communication between the tag 12 and the reader 13. Similarly, the tag 12 could have two antennas at 52 that are perpendicular to each other, in order to facilitate more reliable communication. However, for simplicity and clarity, FIG. 1 shows one antenna at 52 and one antenna at 71.

In the reader 13, the transceiver 72 is coupled to a microcontroller 73, and the microcontroller 73 is coupled to a network interface 76. The network interface 76 is coupled through a network 77 to the control system 14. In FIG. 1, the network 76 is a type of network that is commonly known in the art as an Ethernet network. However, the network 77 could alternatively be any other suitable type of network or communication system. The reader 13 includes some timers that are operatively coupled to the microcontroller 73, for a purpose that is discussed later.

As mentioned earlier, the memory 46 in the tag 12 stores a number of data items at 48. In pre-existing systems, a significant amount of interaction was needed between a tag and a reader in order to transfer several data items from the tag to the reader. For example, the tag and reader would each need to transmit at least one signal just to establish communication with each other. Then, for each item of data that the reader wanted to obtain, the reader would transmit a signal to the tag in order to specifically identify and request the particular data item, and then the tag would transmit back a signal containing the specifically requested data item.

The apparatus 10 shown in FIG. 1 provides a more efficient technique for transmitting data from the tag 12 to the reader 13. As one aspect of this, instead of transmitting data items from the tag 12 to the reader 13 on a one-by-one basis, the apparatus 10 is configured so that the reader 13 can ask the tag to transmit a data block containing several items of data, and the tag 12 will then prepare and transmit the data block to the reader 13.

In more detail, FIG. 2 is a diagrammatic view showing the generic format of a universal data block (UDB) 86. The UDB 86 has N similar data slots, where N is an integer. Each of the N data slots has the same format, including the same three fields. These three fields are a type field, a length field and a data field. The data field contains the actual data. The type field identifies the type of data in the data field, for example whether the data is a temperature from the sensor 44, the current state of a battery, a routing code, or some other type of data. The length field identifies the actual length of the data field. This generic format of the UDB 86 is compatible not only with existing types of data that may need to be sent from the tag 12 to the reader 13, but also with virtually any type of future data.

The number N of data slots in the UDB 86 is not fixed, but can be varied in order to accommodate the number of data items that need to be transferred in a given situation. Ideally, the tag 12 would send the reader 13 a single transmission that included the entire UDB 86. As a practical matter, however, real-world circumstances may be such that it is desirable for the tag 12 to divide the UDB 86 into two or more segments, and then transmit each of the segments in a respective different transmission. For example, where the number N of data items in the UDB 86 is relatively large, the tag 12 may divide the UDB 86 into two or more segments that are sent separately. Alternatively, where the tag 12 and reader 13 are communicating through an ambient environment that is relatively noisy, the UDB 86 may be divided and sent as two or more segments, in order to reduce the likelihood of errors. On the other hand, when the ambient environment is not particularly noisy, the entire UDB 86 may be sent in a single transmission.

The information contained in the wireless signals 24 and 56 will now be discussed in more detail, including an explanation of how the UDB 86 can be transmitted from the tag 12 to the reader 13. In this regard, FIG. 3 is a diagrammatic view of a digital word 101 that is embedded in the signpost signals transmitted at 24. The bits of the digital word 101 are incorporated into the signpost signal 24 by serially modulating the bits of the word 101 onto the 132 KHz carrier using amplitude modulation, as discussed above. The bits of the word 101 are transmitted serially from left to right in FIG. 3.

The digital word 101 includes several fields. The first field is a preamble 103, which is a predefined pattern of bits that will allow a device receiving the signal 24 to recognize that the signpost signal is beginning, and to synchronize itself to the signpost signal. In the disclosed embodiment, the preamble is approximately eight bits, but the specific number of bits can vary in dependence on factors such as characteristics of a particular receiver that is expected to receive the signpost signal.

The next field 104 in the word 101 is a signpost identification (ID) 104. In the disclosed embodiment, the signpost ID 104 is a 12-bit integer value that uniquely identifies a particular signpost 11 that is transmitting the word 101. As mentioned above, the system 10 may have a number of signposts 11, and the use of a respective different signpost ID 104 by each signpost permits the system to distinguish signpost signals transmitted by one signpost from signpost signals transmitted by another signpost. This does not mean that the system could never have two signposts with exactly the same signpost code. For example, two signposts might be stationarily mounted in close proximity to each other, and could be configured to independently transmit signpost signals with the same signpost ID.

Another field in the word 101 of FIG. 3 is a low frequency (LF) window size 106. The window size 106 defines the length of a time interval that a tag 12 will have to transmit a signal at 56 to the reader 13, after the tag receives a signpost signal 24. This is discussed in more detail later. The next field 107 in the word 101 is an error control field 107. Communications between the signpost 11 and other devices are essentially one-way transmissions. In addition, many applications for the apparatus 10 of FIG. 1 involve environments that have relatively high noise levels. Accordingly, it is desirable for a receiving device to be able to evaluate whether the word 101 that it received in a signpost signal is correct, or has errors. Consequently, the error control field 107 is included in the word 101 in order to permit the receiving device to identify and/or correct errors. In the disclosed embodiment, the error control field 107 contains a cyclic redundancy code (CRC). However, it would alternatively be possible to use any other suitable error correction scheme, such as parity information, or a forward error correction (FEC) code.

The next field in the word 101 is a packet end field 108. This field signals to a receiving device that the transmission is ending. In the disclosed embodiment, the packet end field 108 has eight bits that are all set to a binary zero. However, the packet end field 108 could alternatively have any other suitable configuration.

It would be possible for the word 101 to have one or more additional fields, for example as indicated diagrammatically at 111. However, even assuming that additional fields were present, it is not necessary to specifically identify and explain them in order to convey an understanding of the present invention.

As discussed above, the tag 12 has at least two operational modes, including a normal operational mode and a reduced-power sleep mode. When the tag 12 is in its sleep mode and receives a signpost signal 24, the tag will switch from its sleep mode to its normal operational mode. Since the signpost 11 is normally near a reader 13, the tag 12 will respond to the signpost signal 24 by transmitting a type of tag signal 56 that is sometimes referred to as a beacon signal, in order to notify any nearby reader that the tag is present.

FIG. 4 is a diagrammatic view of a digital word 121 that is transmitted in the tag's beacon signal. As shown in FIG. 4, the word 121 begins with a preamble 123. The preamble 123 is functionally comparable to the preamble 103 in the word 101 of FIG. 3. In the disclosed embodiment, the preamble 123 lasts 1.296 msec, and includes 20 cycles that each include a 30 msec logic high and 30 msec logic low, followed by one cycle that includes a 42 msec logic high and then a 54 msec logic low. The next field in the word 121 is a tag status field 124. This field contains some current status information about the tag 12 that is making the transmission.

The next field is a message length field 126, and defines the overall length of the word 121. The next field is a reader ID field 127. In appropriate circumstances, the reader ID field 127 is used to identify a particular reader to which the word 121 is being transmitted. However, in the context of the hypothetical example being discussed here, the tag 12 would typically not yet have the identification code of any particular reader, and would therefore put some form of predefined code in the field 127. For example, the tag might set each of the bits in the field 127 to a binary zero. This predefined code can notify a reader that the signal it has received is a beacon signal from a tag is attempting to establish communication with any reader in its vicinity.

The next field in the word 121 is a tag ID field 128. This is a binary code that uniquely identifies the particular tag 12 that is making this transmission. Thus, when several tags 12 are present in the vicinity of a particular reader 13, the reader can tell which of the tags 12 transmitted each signal that it receives.

The next field in the word 121 is a data field 129. The data field 129 is actually a group of several individual fields 132-134. The field 132 is a tag type field, and identifies the particular type of tag that is transmitting the word 121. Consequently, a reader that receives a wireless signal containing the word 121 will know the particular type or model of tag that transmitted the word 121. The next field 133 is an asset type field. As mentioned earlier, the tag 12 may be mounted on any of a variety of different types of movable assets, such as a forklift or other vehicle, or an item that is being transported. The asset type field 133 can be used to provide the reader 13 with information about the particular type of asset on which the tag 12 is currently mounted. The field 134 is a signpost ID field, and contains the signpost ID from the field 104 of the word 101 (FIG. 3) in the signpost signal most recently received by the tag 12 from any signpost 11.

The word 121 also includes an error control field 137. In the disclosed embodiment, this is a CRC code, but it could alternatively be any other suitable error detecting and/or correcting information. The word 121 ends with a packet end field 138. In the disclosed embodiment, the packet end field 138 is a string of binary zeros representing a logic low that lasts 36 msec. The packet end field 138 indicates to a receiving device that the transmission of the word 121 is ending.

Figures 5, 6:
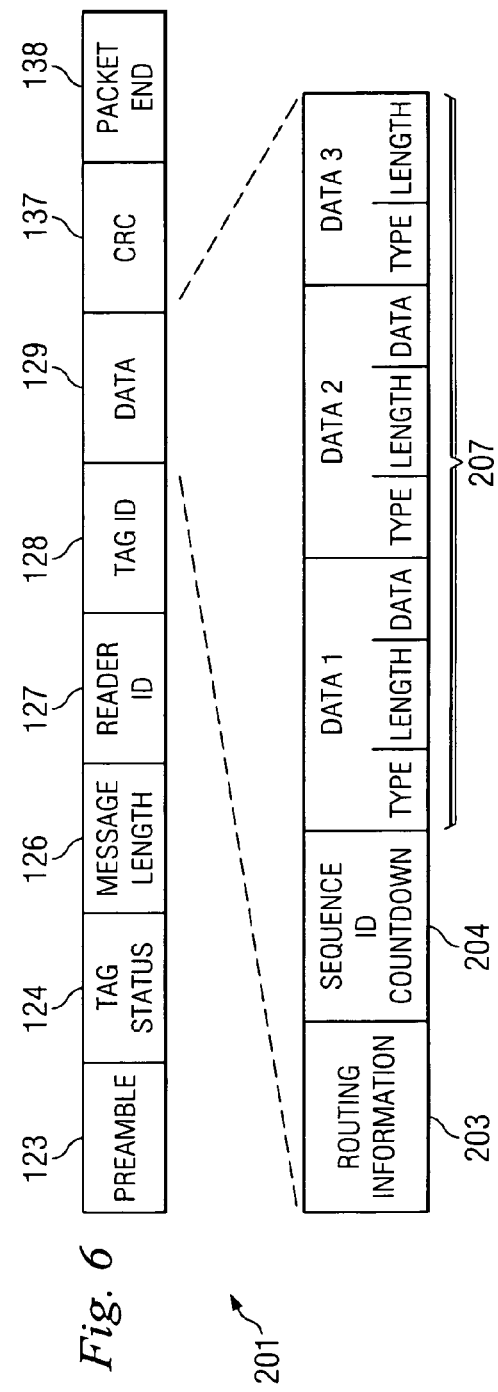
FIG. 5 is a diagrammatic view of a digital word that is present in one type of wireless signal transmitted by the reader of FIG. 1.
FIG. 6 is a diagrammatic view of a digital word that is present in a second type of wireless signal transmitted by the tag of FIG. 1.

When the reader 13 receives a tag signal containing the word 121, the reader transmits a collection signal back to the tag. FIG. 5 is a diagrammatic view of a digital word 151 that is contained in the collection signal transmitted by the reader 13. The word 151 has several fields, and the first is a preamble 152 that is functionally comparable to the preambles 103 and 123 in FIGS. 3 and 4. The preamble 152 is followed by three fields that respectively contain a protocol code 153, a command type 156, and an owner ID 157. It is not necessary to understand these three fields for purposes of the present invention, and these three fields are therefore not described here in detail.

The next field is a reader ID field 158. This is an identification code that is unique to the particular reader that is transmitting the signal containing word 151. The field 158 allows tags that receive the word 151 to identify the particular reader that transmitted it. The next field is an operation code 159. When a tag 12 receives a signal containing the word 151, the operation code 159 tells the tag what it should do in response to the signal. In the hypothetical example being discussed here, the operation code 159 is a predetermined code that tells each tag the received signal is a collection signal.

The operation code field 159 is followed by a parameter field 162, and the parameter field 162 is actually a set of several fields. More specifically, within the parameter field 162, the first field is a UHF window size 164. The window size value at 164 defines the length of a time interval within which tags should transmit a reply after they receive a collection signal containing the word 151. The window size value at 164 is different from the window size value at 106 in the word 101 of FIG. 3, as explained in more detail later.

The next field in the word 151 of FIG. 5 is a maximum packet length field 166. The field 166 defines the maximum amount of information that a tag will be allowed to include in a transmission that it sends in reply to receipt of the word 151. Thus, for example, if the UDB 86 of FIG. 2 is longer than the maximum packet length 166, the tag will need to divide the UDB 86 into at least two segments, and then send each segment in a separate transmission.

The next two fields in the word 151 are a start signpost ID field 167 and a stop signpost ID field 168. The fields 167 and 168 together define the upper and lower bounds of a range of signpost IDs. When a tag 12 receives a collection signal containing the word 151, the tag compares the range defined by the fields 167 and 168 with the signpost ID (104 in FIG. 3) that the tag most recently received from a signpost. If the most recently-received signpost ID is within the range, then the tag will transmit a reply to the collection signal containing the word 151. On the other hand, if the most recently-received signpost ID is outside the range defined by fields 167 and 168, the tag will not reply to the collection signal.

The next field is a UDB type field 169. As discussed above in association with FIG. 1, the microcontroller 43 in each tag 12 has a memory 46 that stores a plurality of set definitions 47. Each set definition identifies a respective different set of the plural data items 48 that are stored in the memory 46. When a tag receives a collection signal containing the word 151, the UDB type field 169 identifies a selected one of the set definitions stored at 47, and this selected set definition identifies a particular set of the data items stored at 48. The tag 12 then sets up a UDB 86 (FIG. 2), and populates each data slot with a respective different data item identified by the particular set definition specified by the UDB type field 169.

The last two fields in the word 151 are an error control field 173 containing a CRC code, and a packet end field 174. The error control field 173 is comparable to the error control fields shown at 107 in FIG. 3 and 137 in FIG. 4. The packet end field 174 is comparable to the packet end fields shown at 108 in FIG. 3 and 138 in FIG. 4.

When the tag 12 receives the collection signal containing the word 151 of FIG. 5, the tag responds by transmitting to the reader 13 a further tag signal that will contain at least part of a UDB 86 requested at 169 (FIG. 5) by the collection signal. More specifically, this tag signal will include a digital word that is shown diagrammatically at 201 in FIG. 6. The digital word 201 is similar in many respects to the digital word 121 of FIG. 4. Therefore, the following discussion will focus primarily on the differences.

More specifically, since the tag 12 has received the collection signal containing the word 151 of FIG. 5, where field 158 contains a reader ID, the tag will take the reader ID from field 158 and put it in the reader ID field 127 of the word 201. This has the effect of earmarking the word 201 for use by a particular reader 13. If any other reader happens to receive the tag signal containing the word 201, it will ignore the word 201.

The data contained in the data field 129 of the word 201 is different from the data contained in the data field 129 of the word 121. More specifically, the data field 129 in the word 201 is actually a group of several individual fields, the first of which is a routing information field 203. The routing information field 203 identifies a destination to which the reader 13 and the control system 14 are to send information relating to the tag 12 that generated the word 201.

The next field 204 is a sequence ID countdown field. When the tag 12 has to divide the UDB 86 of FIG. 2 into two or more segments that will be sent to the reader 13 in respective different transmissions, the sequence ID countdown field 204 is used to tell the reader 13 how many separate transmissions will be sent, and to uniquely identify each transmission. In particular, in the transmission that contains the first data segment of the UDB 86, the sequence ID countdown field 204 will contain a value that is the total number of data segments. As each successive data segment is transmitted, the value in the sequence ID countdown field 204 is decremented so that, when the last data segment is transmitted, the sequence ID countdown field 204 will have a value of "1". Where the tag is able to send the entire UDB 86 in a single transmission, the sequence ID countdown field 204 in that transmission will contain a value of "1".

The sequence ID countdown field 204 is followed by a segment 207 that contains part of the UDB 86. More specifically, the segment 207 contains two data items, and part of a third data item. The remainder of the third data item will be sent by the tag 12 in a subsequent transmission, as discussed later.

Figure 7:
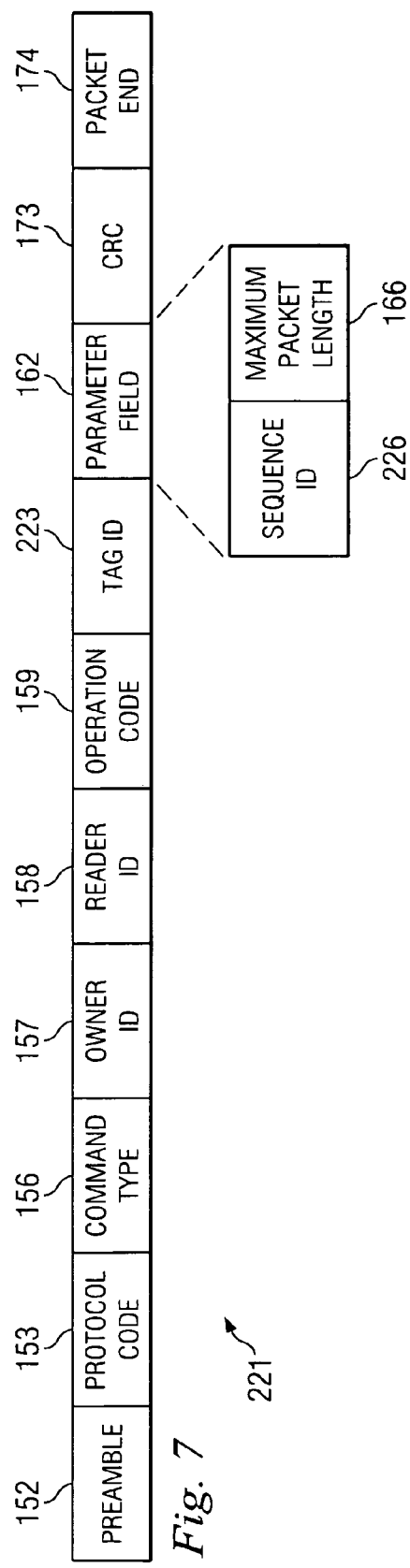
FIG. 7 is a diagrammatic view of a digital word that is present in a second type of wireless signal transmitted by the reader of FIG. 1.

After the reader 13 receives the tag transmission that contains the word 201 of FIG. 6, the reader 13 will examine the sequence ID countdown field 204 in the word 201, in order to determine whether the reader has received the entire UDB that is being transmitted by the tag. If not, then the reader will transmit one or more request signals to separately request each of the remaining segments of the UDB. FIG. 7 is a diagrammatic view of a digital word 221 that is contained in each such request signal. Many of the fields in the word 221 are identical or equivalent to fields in the word 151 of FIG. 5. The following discussion will therefore focus on the differences.

First, the operation code field 159 will contain a different operation code, in order to indicate to the tag 12 that this a request signal rather than a collection signal. It will be noted that the operation code field 159 is followed by a tag ID field 223. The value in the tag ID field 223 is the value that the reader 13 received from the tag in the tag ID field 128 of the word 201 (FIG. 6). Thus, although the collection signal containing the word 151 of FIG. 5 was transmitted to any and all tags 12 within the transmission range of the reader, the request signal containing the word 221 of FIG. 7 is intended for use by a single tag, and in particular the tag that has the tag ID present in the field 223. Other tags may receive the request signal, but each will ignore it if the value in the tag ID field 223 is different from its own tag ID.

In the word 221 of FIG. 7, the information in the parameter field 162 is different from the information in the parameter field 162 of the word 151 (FIG. 5). More specifically, the parameter field 162 in the word 221 begins with a sequence ID field 226. In this field, the reader identifies a particular segment of the UDB that the reader 13 wants the tag 12 to send. The reader 13 will put the number "1" in this field if it wants the tag 12 to send the second data segment of the UDB, will put the number "2" in this field if it wants the tag to send the third data segment, and so on. If the reader 13 detects an error in a transmission received from the tag, the reader 13 can ask the tag to re-transmit a particular data segment by sending another request signal in which the sequence ID field 226 contains the numerical value that identifies the data segment associated with the error.

When the tag receives a request signal containing the word 221 of FIG. 7, the tag will respond by sending the next data segment from the UDB 86. In this regard, the signal transmitted by the tag will include the digital word that is shown diagrammatically at 241 in FIG. 8. Many of the fields in the digital word 241 are identical or equivalent to fields in the word 201 of FIG. 6. To avoid redundancy, these fields are not described again here. Instead, the following discussion will focus on differences.

In this regard, the tag ID field 128 is followed by an operation code field 243. The tag 12 places in the operation code field 243 the operation code that the tag received in the operation code field 159 of the word 221 previously received from the reader 13. In the word 241, the data field 129 does not include the routing information shown at 203 in FIG. 6, because this routing information has already been sent to the reader. The data field 129 does include the sequence ID countdown field 204, and also the next segment 246 of the UDB 86. It will be noted that the UDB segment 246 includes the remainder of the third data item, as well as a fourth data item. This exemplary UDB has only four data items, and thus the data segment 246 contains the last of the data from the UDB. Consequently, it will be noted that the data field 129 in the word 241 is shorter than the data field 129 in the word 201. This in turn means the word 241 has an overall length that is shorter than the overall length of the word 201. This is handled by setting the message length field 126 to different values for each of the words 201 and 241.

Figure 8:
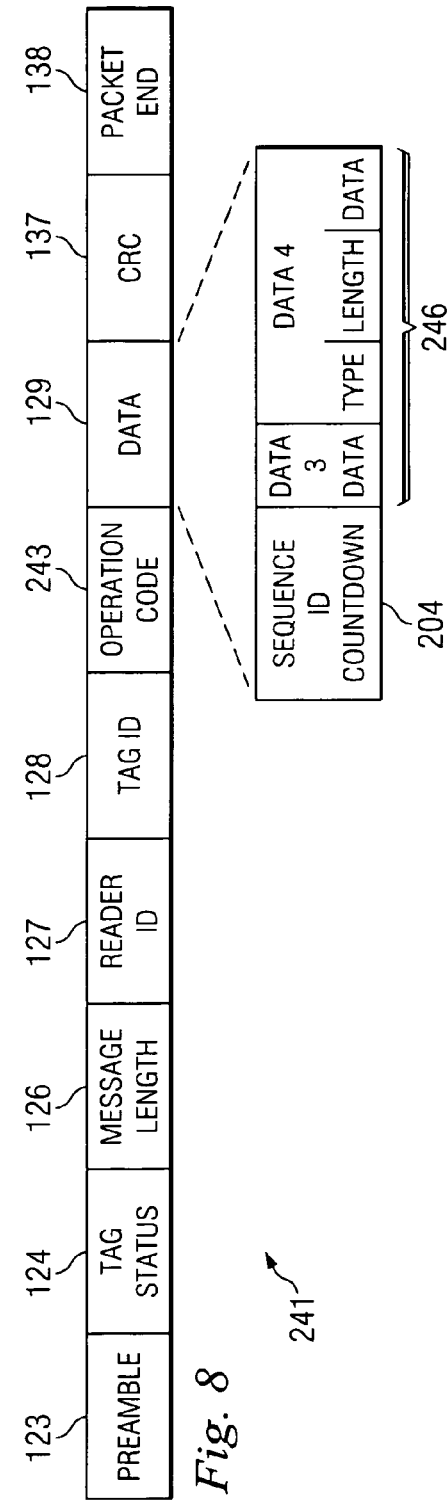
FIG. 8 is a diagrammatic view of a digital word that is present in a third type of wireless signal transmitted by the tag of FIG. 1.

After receiving the tag signal containing the word 241 of FIG. 8, the reader 13 can combine the data segment 207 from the word 201 (FIG. 6) with the data segment 246 from the word 241 (FIG. 8), in order to reassemble the entire UDB 86 the reader 13 can then send this UDB on to the control system 14, along with other relevant information, such as the identity of the particular tag 12 that sent the UDB. It should be noted that the reader 13 does not need to analyze or interpret the UDB, but can simply send it on to the control system 14. The reader 13 sends along the routing information shown at 203 in FIG. 6, and the control system 14 can use the routing information 203 to forward the UDB and/or information about the tag 12 to a destination specified by the routing information 203.

Figure 9:
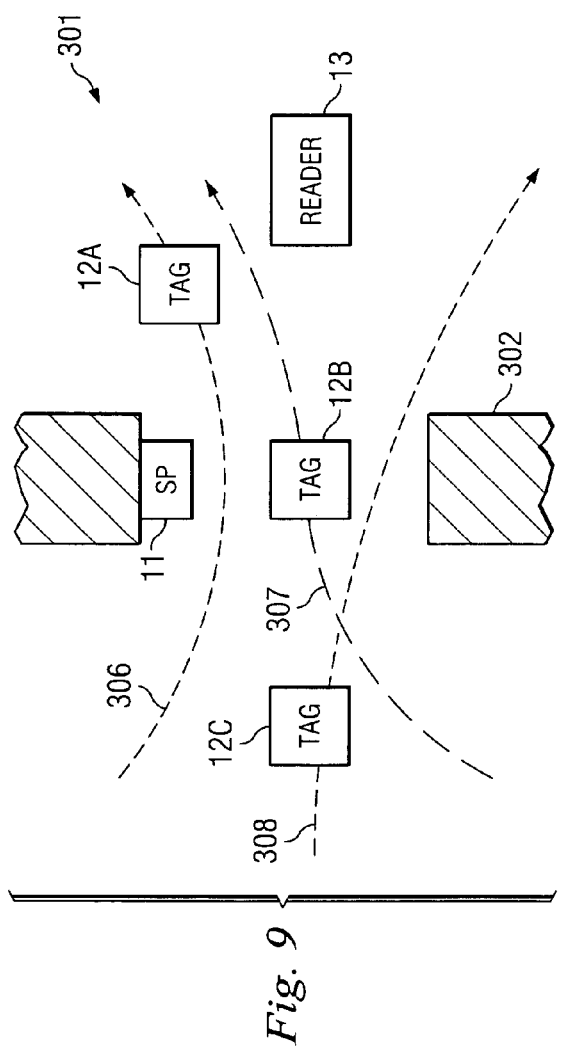
FIG. 9 is a diagrammatic top view of one possible application for an apparatus of the type shown in FIG. 1.

FIG. 9 is a diagrammatic top view of a particular hypothetical application 301 for the signpost 11, the reader 13, and three tags that are respectively identified by reference numerals 12A, 12B and 12C. The signpost 11 is stationarily mounted by a doorway or gate 302 that constitutes a "choke point". The reader 13 is stationarily mounted on a not-illustrated ceiling in the vicinity of the doorway 302. Assume that the tags 12A, 12B and 12C are traveling along respective paths of travel 306-308, such that the tags each pass through the doorway 302. It will be noted that the tag 12A passes through the doorway first, followed by the tag 12B, and then the tag 12C.

Figure 10:
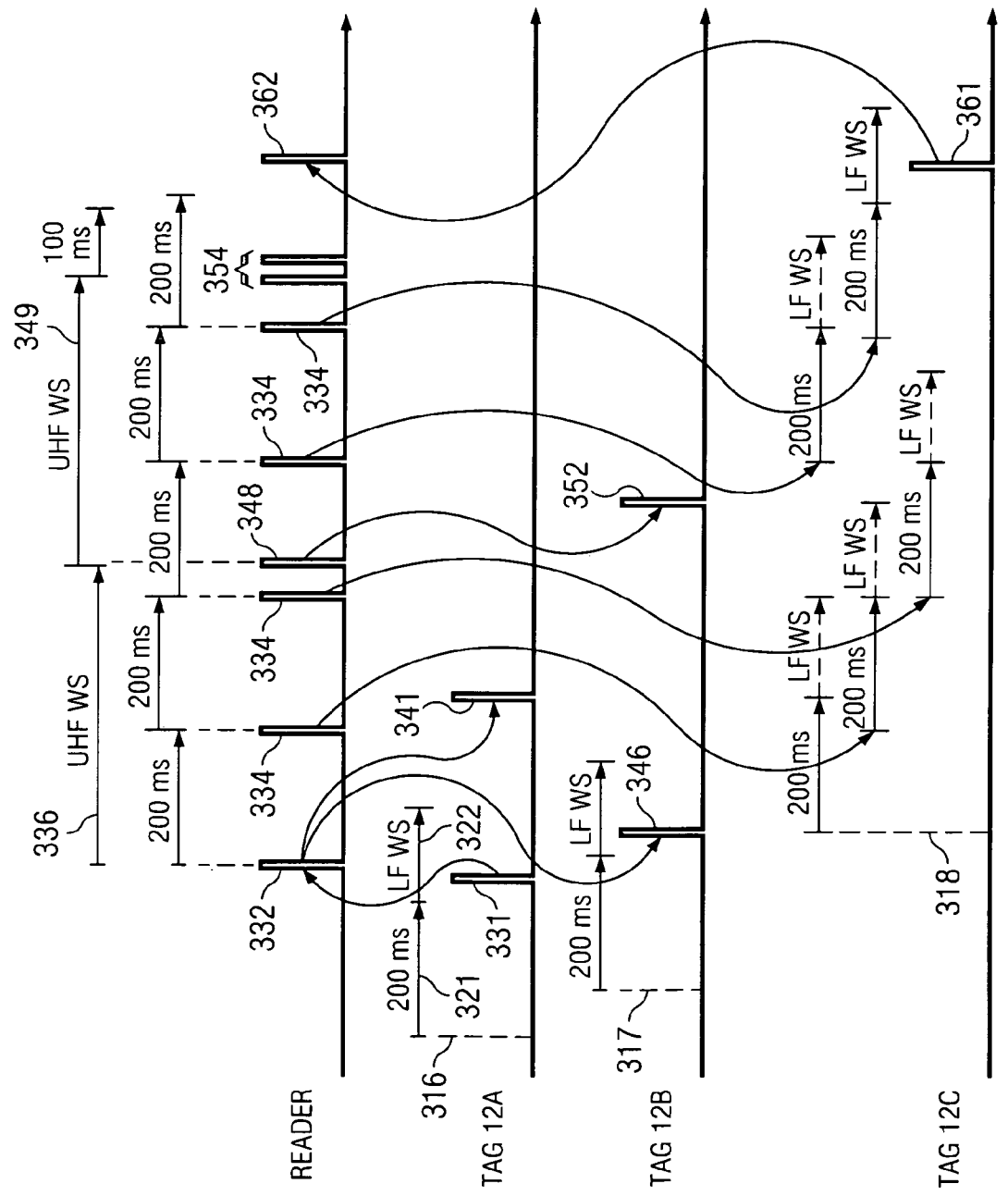
FIG. 10 is a timing diagram showing a sequence of events that can occur in the application depicted in FIG. 9.

FIG. 10 is a timing diagram showing a sequence of events that can occur as the tags 12A-12C successively pass through the doorway 302. As mentioned above in association with FIG. 9, the tags 12A, 12B and 12C pass successively through the doorway 302, and thus encounter the transmission field of the signpost 11 at successive different points in time. In FIG. 10, reference numerals 316, 317 and 318 designate the points in time at which the tags 12A, 12B and 12C respectively encounter the transmission field of the signpost 11.

The tags are designed so that, when each tag first encounters the transmission field of the signpost 11, the tag does not immediately transmit any wireless signal. Instead, the tag waits for a time interval of 200 msec, while listening for any transmission by a reader. This 200 msec time interval is identified by reference numeral 321 in FIG. 10. During this 200 msec time interval 321, if a tag receives from a reader a wireless signal that is referred to as a "quiet" signal, the tag immediately restarts the 200 msec wait period. On the other hand, if the tag receives from a reader the wireless collection signal shown in FIG. 5, the tag will immediately terminate the 200 msec wait, and begin preparing to transmit the tag signal shown in FIG. 6, including all or part of a UDB. On the other hand, if the tag does not receive any wireless signal from a reader during the 200 msec time interval 321, then the tag will prepare to transmit its beacon signal (FIG. 4). In this regard, the window size value 106 (FIG. 3) that the tag received from the signpost 11 defines a time interval 322 (FIG. 10) that begins at the end of the time interval 321, and that represents a window during which the tag is to transmit its tag or beacon signal (FIG. 4). The tag 12 basically divides the time interval 322 into a plurality of time slots that are not illustrated, randomly selects one or more of these time slots, and then transmits its beacon signal during each selected time slot.

With reference to FIG. 9, the tag 12A is the first tag to encounter the signpost 11, at a point in time 316 (FIG. 10). The tag 12A then begins waiting out the 200 msec time interval 321. The reader 13 is not currently transmitting, and thus the tag 12 will not receive any wireless signals from the reader 13. Consequently, after the end of time interval 321 and during the time interval 322, the tag 12A will transmit its tag or beacon signal (FIG. 4). This wireless signal is identified diagrammatically at 331 in FIG. 10.

The signal 331 will be received by the reader 13, and will cause the reader 13 to embark on a collection sequence. The collection sequence begins with transmission of the collection signal that is shown in FIG. 5, and that is indicated diagrammatically at 332 in FIG. 10. Following transmission of this collection signal 332, the reader 13 repeatedly transmits the quiet signal during the collection sequence, at periodic time intervals that are spaced by 200 msec or slightly less, as indicated diagrammatically at 334 in FIG. 10.

As mentioned earlier, the collection signal of FIG. 5 contains a UHF window size value 164. This window size value 164 defines the length of a time interval during which each tag should respond to the collection signal. This time interval is shown at 336 in FIG. 10. Depending on operational circumstances, the reader 13 or the control system 14 may increase or decrease the window size value 164, and thus the length of the time interval 336, in order to optimize operation and promote throughput while minimizing errors. In response to receipt of the collection signal from the reader 13, the tags 12A, 12B and 12C each divide the specified time interval 336 into a plurality of slots, randomly select one or more of these slots, and then transmit the tag signal of FIG. 6 in each selected slot. For example, in FIG. 10, the tag 12A transmits a tag signal of the type shown in FIG. 6. For purposes of the hypothetical application shown in FIG. 9, it is assumed that the tag 12A is able to include its entire UDB in this single transmission. Consequently, upon transmitting a tag signal of the type shown in FIG. 6, the tag 12A will have completed transmission of its entire UDB to the reader 13.

Turning now to tag 12B, FIG. 10 shows that the reader 13 transmits its collection signal 332 during a 200 msec time interval when the tag 12B is listening for transmissions from readers. The tag 12B will receive this collection signal, and will respond by selecting at least one time slot during the time interval 336 defined by the UHF window size. The tag 12b will then transmit a tag signal of the type shown in FIG. 6 with a first portion of its UDB, as shown diagrammatically at 346 in FIG. 10. For the purpose of this hypothetical example, it is assumed that the tag 12B finds it needs to divide its UDB into two segments. Upon expiration of the time interval 336 defined by the UHF window size, the reader 13 transmits to the tag 12B a request signal of the type shown in FIG. 7. This request signal instructs the tag 12B to send the next segment of its UDB. Within the time interval 349 that corresponds to the UHF window size, the tag selects at least one time slot, and then transmits the next segment of its UDB during each selected time slot, as indicated diagrammatically at 352 in FIG. 10. Upon expiration of the time interval 349, the reader 13 will find that it has received an entire UHB from the tag 12A, and also an entire UHB from the tag 12B. Therefore, upon expiration of the time interval 349, the reader 13 will promptly transmit two sleep signals 354, one of which tells the tag 12A to switch to its sleep mode, and the other of which tells the tag 12B to switch to its sleep mode. Accordingly, the tags 12A and 12B each enter the sleep mode.

Turning to the tag 12C, and as discussed above in association with FIG. 9, the tag 12C passes the signpost 11 after tags 12A and 12B have already passed the signpost. The tag 12C first encounters the transmission field of the signpost 11 at point 318 in FIG. 10, or in other words after the reader 13 has transmitted its collection signal 332. Consequently, during the 200 msec period when the tag 12C is listening for signals from the reader 13, the tag 12C will successively receive each of the four quiet signals 334 (FIG. 10). Each of these quiet signals will restart timing of the 200 msec time interval. After receipt of the final quiet signal 334 in FIG. 10, the tag 12C waits 200 msec while listening for reader signal, but does not happen to receive a collection signal or a quiet signal from the reader 13. Therefore, after expiration of this 200 msec time interval, the tag 12C will transmit its tag or beacon signal (FIG. 4), as shown diagrammatically at 361 in FIG. 10. This transmission by tag 12C is equivalent to the prior transmission by tag 12A of beacon signal 331. The beacon signal causes the reader 13 to initiate another collection sequence, beginning with transmission of a further collection signal 362. During this further collection sequence, the tag 12C will send the reader 13 one or more wireless signals that contain a UDB.

Figure 11:
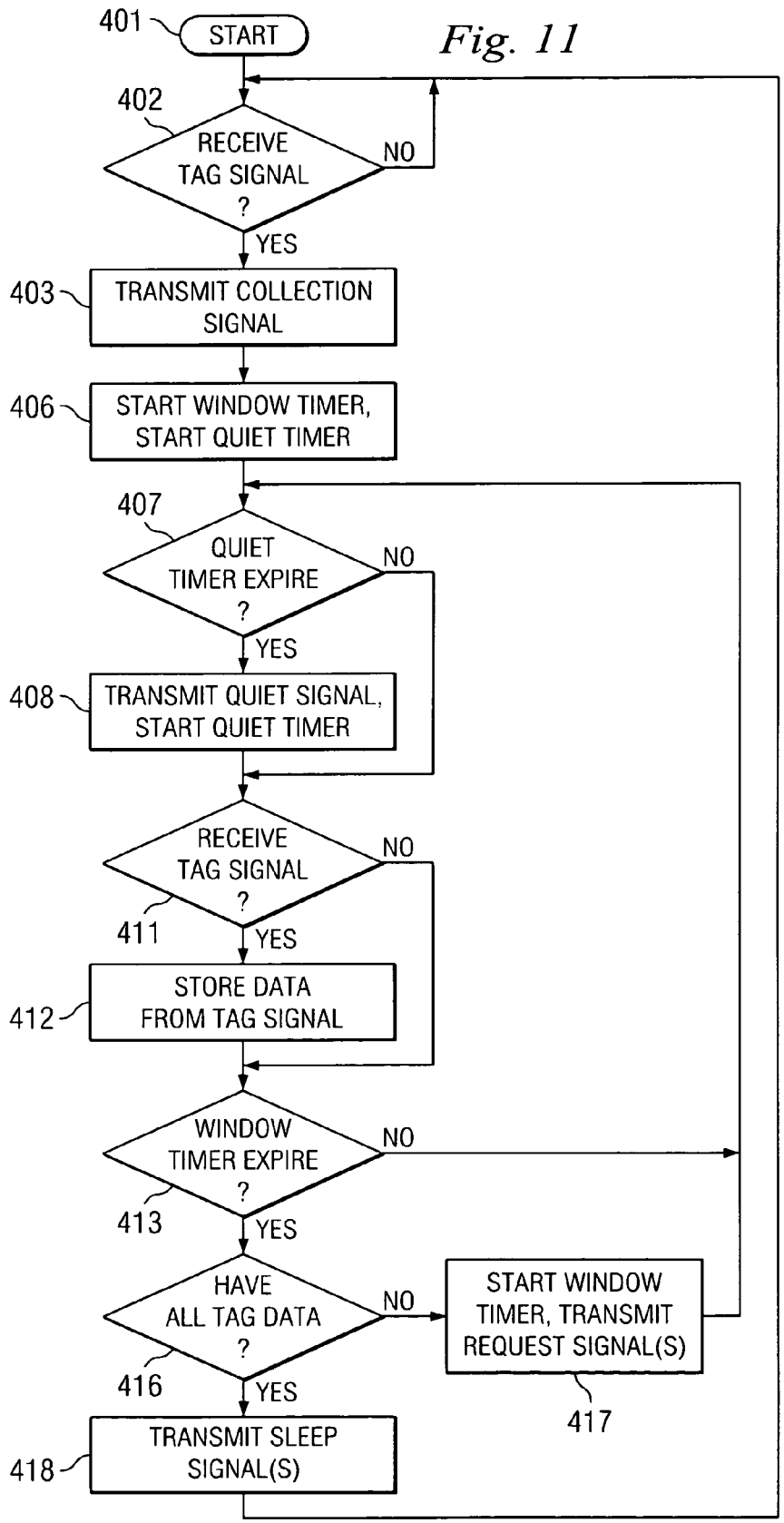
FIG. 11 is a high-level flowchart showing a sequence of operations carried out by the reader of FIG. 1 when used in the application depicted in FIG. 9.

FIG. 11 is a high-level flowchart showing in a different format the sequence of operations carried out by the reader 13 during a collection sequence of the type shown in FIG. 10. In FIG. 11, the sequence starts at 401, and proceeds to block 402, where the reader 13 waits to receive a tag or beacon signal of the type shown in FIG. 4, and also shown at 331 and 361 in FIG. 10. When such a signal is received, the reader proceeds to block 403, where it transmits a collection signal of the type shown in FIG. 5, and also shown at 332 and 362 in FIG. 10. Then, at block 406, the reader starts two of the timers 79 (FIG. 1). In particular, the reader starts a window timer that will measure the time interval shown at 336 in FIG. 10, based on the UHF window size. Further, the reader starts a quiet timer that will measure the 200 msec time interval between successive quiet signals 334 in FIG. 10.

The reader then proceeds to block 407, where it checks to see if the quiet timer has expired. If the quiet timer has expired, then at block 408 the reader transmits the quiet signal 334 (FIG. 10) and restarts the 200 msec quiet timer. From either block 407 or block 408, the reader proceeds to block 411. In block 411, the reader checks to see whether it has received a reply from any tag, in the form of the tag signal shown in FIG. 6, and also shown at 341 and 346 in FIG. 10. When the reader finds that it has received such a tag signal, the reader proceeds to block 412, where it stores the data from the tag signal, including all or part of a UDB. During the time interval 336 in FIG. 10, the reader may receive tag signals of this type from a large number of tags.

From either block 411 or block 412, the reader proceeds to block 413, where it checks to see whether the window timer has expired. If not, then the reader returns to block 407. If the window timer has expired, then the reader proceeds to block 416. In block 416, the reader determines whether it has received all UDB data that it requested from each of the tags with which it is communicating. If not, then the reader proceeds to block 417, where it restarts the window timer, and transmits one or more request signals of the type shown in FIG. 7, and also shown at 348 in FIG. 10. In particular, the reader transmits such a request signal to each tag from which the reader has not yet received all segments of a UDB. From block 417, the reader returns to block 407.

If the reader determines in block 416 that it has received all data that it requested from each of the tags with which it is communicating, then the reader proceeds to block 418, where it transmits a respective sleep signal to each of the tags from which it has collected data, as indicated diagrammatically at 354 in FIG. 10. In particular, the reader 13 transmits respective sleep signals to the tag 12A and the tag 12B. On the other hand, the reader 13 does not transmit a sleep signal to the tag 12C, because the reader 13 is not yet aware of the presence of tag 12C, and has not yet collected data from tag 12C. The reader 13 then returns to block 402, to wait for receipt of the next tag beacon signal. It will be recognized that the reader 13 also carries out other tasks, such as forwarding to the control system 14 the data that the reader has collected from each tag. For clarity, and to avoid confusion, these other tasks have been intentionally omitted from the flowchart of FIG. 11.

Figure 12:
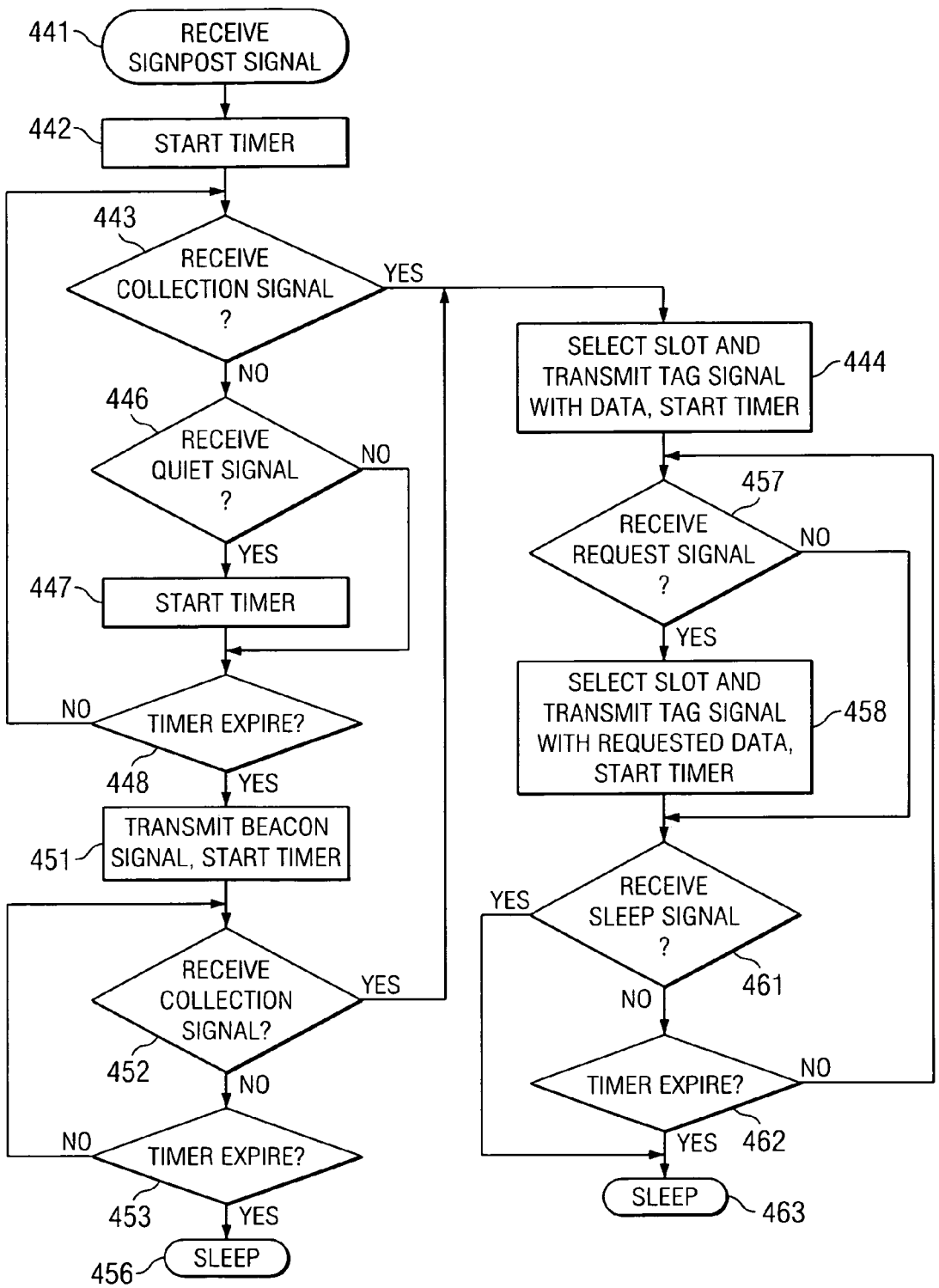
FIG. 12 is a high-level flowchart showing a sequence of operations carried out by the tag of FIG. 1 when used in the application depicted in FIG. 9.

FIG. 12 is a high-level flowchart showing in a different format the sequence of operations carried out by each of the tags 12A, 12B and 12C during a collection sequence of the type shown in FIG. 10. It is assumed that each tag is in its sleep mode when it first encounters the transmission field of the signpost 11. When the tag finds in block 441 that it has received a signpost signal, the tag switches from its sleep mode to its normal operational mode, and proceeds to block 442. In block 442, the tag starts the timer shown at 49 in FIG. 1, in order to measure the 200 msec time interval shown at 321 in FIG. 10.

As explained earlier, the tag waits during this 200 msec time interval, while listening for certain wireless signals from a reader. In particular, the tag proceeds to block 443, where it checks to see if it has just received a collection signal of the type shown in FIG. 5, and also shown at 332 and 362 in FIG. 10. If so, then the tag proceeds to block 444, which is discussed later. Otherwise, the tag proceeds to block 446, where it checks to see if it has received a quiet signal of the type shown at 334 in FIG. 10. If so, then at block 447 the tag restarts its 200 msec timer. From either block 446 or 447, the tag proceeds to block 448.

In block 448, the tag checks to see whether the 200 msec timer has expired. If the timer has not expired, then the tag returns to block 443. Otherwise, the tag proceeds from block 448 to block 451. In block 451, the tag transmits a tag or beacon signal of the type shown in FIG. 4, and shown at 331 and 361 in FIG. 10. The tag then starts its timer, in order to measure the time interval shown at 322 in FIG. 10, where the length of this time interval depends on the specified low frequency window size (106 in FIG. 3). The tag then waits to see whether it receives a collection signal. In particular, the tag proceeds to block 452, where it checks to see if it has received a collection signal. If not, then it proceeds to block 453, where it checks to see if the timer has expired. If the timer has expired, then the tag proceeds to block 456, and returns to its sleep mode, in order to conserve battery power. On the other hand, if the tag determines at block 453 that its timer has not expired, the tag returns to block 452 in order to continue to wait for a collection signal. If at some point the tag discovers in block 452 that it has received a collection signal, then the tag proceeds to block 444.

In block 444, the tag selects one or more time slots within the time interval 336 of FIG. 10, and then transmits in each selected slot a tag signal of the type shown in FIG. 6, which includes all or part of a UDB. At this point, the tag expects that it will eventually receive some form of further communication from the reader. However, it is possible that some type of error may occur, such that the tag does not actually receive any further communication. In order to detect and handle such an error, the tag starts a timer 49 that will eventually put the tag to sleep if the tag has not received the expected further communication from the reader, in order to conserve battery power.

From block 444, the tag proceeds to block 457, where it checks to see whether it has received from the reader a request signal of the type shown in FIG. 7, and shown at 348 in FIG. 10. If so, then the tag proceeds to block 458, where it selects one or more time slots within the time interval shown at 349 in FIG. 10, and then transmits in each selected time slot a tag signal of the type shown in FIG. 8, and shown at 352 in FIG. 10. This tag signal includes another segment of data from the UDB. The tag then restarts the timer that is running. From either block 457 or block 458, the tag proceeds to block 461.

In block 461, the tag checks to see whether it has received from the reader a sleep signal of the type shown at 354 in FIG. 10. If so, the tag proceeds to block 463, and returns to its sleep mode. Otherwise, the tag proceeds from block 461 to block 462, where it checks to see if the timer has expired. If not, then the tag returns to block 457, to wait for the next communication from the reader. On the other hand, if the tag finds at block 462 that the timer has expired, then an error has occurred, because the tag has not received an expected communication from the reader within a reasonable period of time. Accordingly, the tag proceeds to block 463 to return to the sleep mode.

Figure 13:
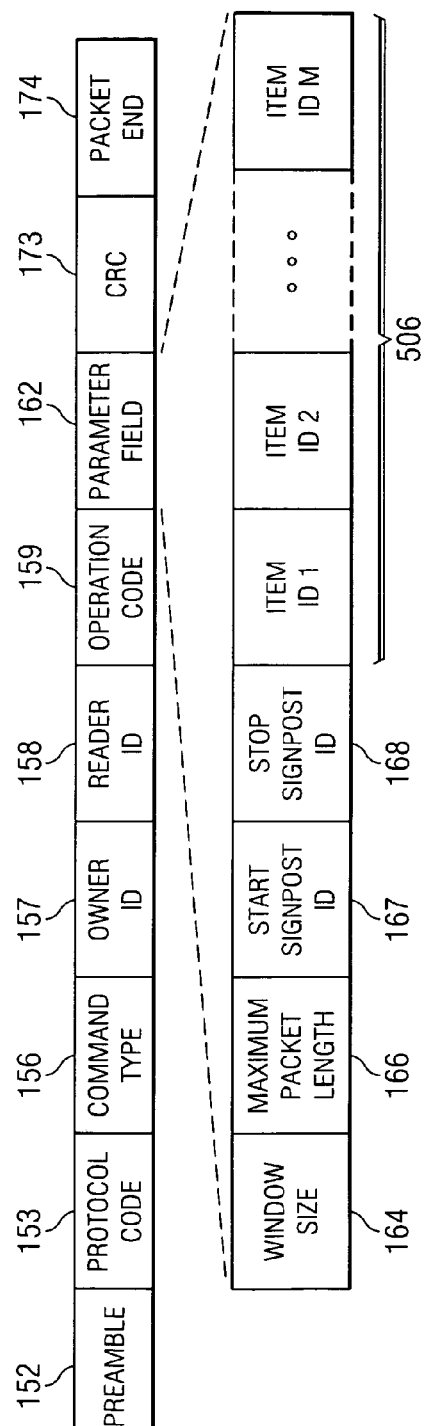
FIG. 13 is a diagrammatic view of a digital word that is an alternative embodiment of the digital word in FIG. 5.

As discussed above, the word 151 in the collection signal includes a UDB type field 169. This UDB type field 169 identifies one of the set definitions stored at 47 in the memory 46 of the tag 12. In turn, the selected set definition specifically identifies one or more data items that are stored at 48. The tag then populates a UDB 86 (FIG. 2) with these specific data items. FIG. 13 is a diagrammatic view of a digital word 501 that can be sent in a collection command, and that is an alternative embodiment of the digital word 151 of FIG. 5. There is one significant difference between the digital word 501 of FIG. 13 and the digital word 151 of FIG. 5. In particular, the UDB type field 169 in the digital word 151 has been replaced with a list 506 that contains several item ID fields. In particular, each field in the list 506 sets forth a respective item ID code for a respective data item that is stored at 48 in the memory 46 of the tag 12 (FIG. 1). Thus, in the list 506, the reader 13 specifies exactly which data items it would like to receive. As a result, the reader does not need to rely on one of the predefined set definitions at 47, which may specify more or less information than the reader would ideally like to receive. When the tag 12 receives a collection signal of the type shown in FIG. 13, it prepares a UDB 86 (FIG. 2) that is populated with the specific set of data items identified by the list 506. Then, it sends the UDB to the reader 13, in the manner that has already been described in detail above.

Although selected embodiments have been illustrated and described in detail, it should be understood that a variety of substitutions and alterations are possible without departing from the spirit and scope of the present invention, as defined by the claims that follow.

What is claimed is:

1. An apparatus comprising a tag having circuitry that includes:
   a communication portion that can transmit and receive wireless signals, including wireless transmission of data blocks each having a predefined configuration that includes a plurality of data slots; and
   a further portion that, in response to receipt through said communication portion of a wireless communication containing a request identifying a set of plural data items, populates respective said data slots in one said data block with respective said data items from said set, and then causes said communication portion to effect wireless transmission of said one data block.

2. An apparatus according to claim 1, wherein said request includes a list that individually identifies each of said plural data items in said set.

3. An apparatus according to claim 1,
   wherein said tag stores a plurality of different predefined set definitions that each identify a respective different plurality of data items;
   wherein said request identifies one of said set definitions; and
   wherein said further portion of said tag carries out said populating of the data slots in said one data block using the data items identified by the set definition identified in said request.

4. An apparatus according to claim 1, wherein said request includes an identification of the length of a time interval during which said tag is to transmit a wireless transmission in response to said request.

5. An apparatus according to claim 1,
   wherein said communication portion can receive wireless signpost signals that each include a signpost identification code; and
   wherein said request identifies a range of signpost identification codes, said further portion of said tag inhibiting said transmission of said one data block if the signpost identification code most recently received by said tag is outside said range of identification codes.

6. An apparatus according to claim 1, wherein said tag effects said wireless transmission of said one data block by dividing said one data block into a plurality of data segments and by effecting a plurality of successive transmissions that each include a respective said data segment.

7. An apparatus according to claim 6, wherein said tag transmits said successive transmissions in response to receipt of respective communications in a series of wireless communications, the first of said wireless communications in said series being said wireless communication containing said request.

8. An apparatus according to claim 7, wherein, after said wireless communication containing said request, each of said wireless communications in said series includes a respective sequence identifier that uniquely identifies a respective said data segment that said further portion of said tag is to transmit in the next of said successive transmissions.

9. An apparatus according to claim 6, wherein said request includes information that determines a maximum permissible size for said data segments.

10. An apparatus according to claim 6, wherein said successive transmissions each include a respective sequence identifier that uniquely identifies a respective said data segment in said one data block.

11. An apparatus according to claim 10, wherein said sequence identifiers are successive integers transmitted in reverse numerical order, the sequence identifier in the first of said successive transmissions being the total number of data segments in said one data block.

12. An apparatus according to claim 1, wherein each of said data blocks is transmitted with routing information that identifies a destination for that data block.

13. An apparatus according to claim 1, wherein said data slots each conform to a uniform format.

14. An apparatus according to claim 13, wherein said uniform format includes each said data slot having a data field containing the corresponding data item, a length field that identifies the length of the data field, and a type field that identifies the type of data item in the data field.

15. An apparatus according to claim 1,
wherein said tag has a memory with a plurality of separate data items stored therein; and
wherein said tag effects said population of said data slots in said one data block using data items retrieved from said memory.

16. An apparatus according to claim 1, including a reader, said reader transmitting to said tag said wireless communication containing said request, and receiving said one data block transmitted by said tag in response to said request.

17. A method of operating a tag, comprising:
receiving in said tag a wireless communication containing a request identifying a set of plural data items;
preparing a data block that conforms to a predefined configuration and that has a plurality of data slots, including populating respective said data slots in said data block with respective said data items from said set; and
transmitting said data block in a wireless manner.

18. A method according to claim 17, including configuring said request to include a list that individually identifies each of said plural data items in said set.

19. A method according to claim 17, including:
storing in said tag a plurality of different predefined set definitions that each identify a respective different plurality of data items;
configuring said request to identify one of said set definitions; and
carrying out said populating of the data slots in said data block using the data items identified by the set definition identified in said request.

20. A method according to claim 17, including configuring said request to include an identification of the length of a time interval during which said tag is to transmit a wireless transmission in response to said request.

21. A method according to claim 17, including:
receiving in said tag wireless signpost signals that each include a signpost identification code;
configuring said request to identify a range of signpost identification codes; and
inhibiting said wireless transmission of said data block by said tag if the signpost identification code most recently received by said tag is outside said range of identification codes.

22. A method according to claim 17, wherein said transmitting of said data block includes:
dividing said data block into a plurality of data segments; and
effecting a plurality of successive transmissions that each include a respective said data segment.

23. A method according to claim 22, including:
receiving in said tag a series of wireless communications, the first of which is said request; and
transmitting each of said successive transmissions in response to receipt of a respective one of said communications in said series.

24. A method according to claim 23, including configuring each said wireless communication in said series after said request to include a respective sequence identifier that uniquely identifies a respective said data segment that said tag is to transmit in the next of said successive transmissions.

25. A method according to claim 22, including configuring said request to include information that determines a maximum permissible size for said data segments.

26. A method according to claim 22, including configuring said successive transmissions to each include a respective sequence identifier that uniquely identifies a respective said data segment in said data block.

27. A method according to claim 26, including selecting successive integers in reverse numerical order to serve as said sequence identifiers, the sequence identifier in the first of said successive transmissions being the total number of data segments in said data block.

28. A method according to claim 17, wherein said transmitting includes sending routing information with said data block, said routing information identifying a destination for said data block.

29. A method according to claim 17, including configuring said data block so that said data slots each conform to a uniform format.

30. A method according to claim 29, including configuring said uniform format so that each said data slot has a data field containing the corresponding data item, a length field that identifies the length of the data field, and a type field that identifies the type of data item in the data field.

* * * * *